United States Patent [19]

Engelsmann

[11] 4,131,353
[45] Dec. 26, 1978

[54] PHOTOGRAPHIC CAMERA

[75] Inventor: Dieter Engelsmann, Unterhaching, Fed. Rep. of Germany

[73] Assignee: AGFA-Gevaert AG, Leverkusen, Fed. Rep. of Germany

[21] Appl. No.: 752,315

[22] Filed: Dec. 20, 1976

[30] Foreign Application Priority Data

Dec. 23, 1975 [DE] Fed. Rep. of Germany ....... 2558276

[51] Int. Cl.² .......................... G03B 3/00; G03B 13/02
[52] U.S. Cl. .................................................. 354/197
[58] Field of Search ...................... 354/195, 197, 198; 355/55; 352/142; 350/183, 254, 39

[56] References Cited

U.S. PATENT DOCUMENTS

| 3,890,626 | 6/1975 | Ettischer | 354/197 |
| 4,038,671 | 7/1977 | Schroder et al. | 354/197 |

Primary Examiner—John Gonzales
Attorney, Agent, or Firm—Michael J. Striker

[57] ABSTRACT

A camera has two or more different photographic lenses which are mounted for displacement transverse to the optical axis of the camera, so that each lens can be moved into and out of an operative picture-taking position. An arrangement is provided which imparts to at least one of these lenses a component of movement in direction longitudinally of the optical axis in automatic response to the movement of this lens to said picture-taking position.

8 Claims, 4 Drawing Figures

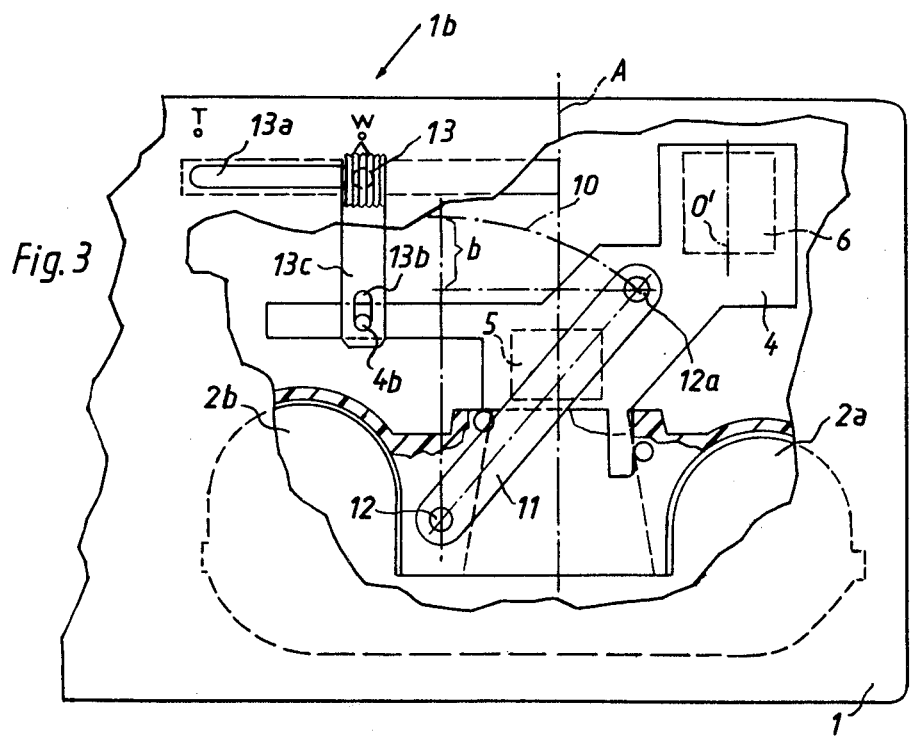
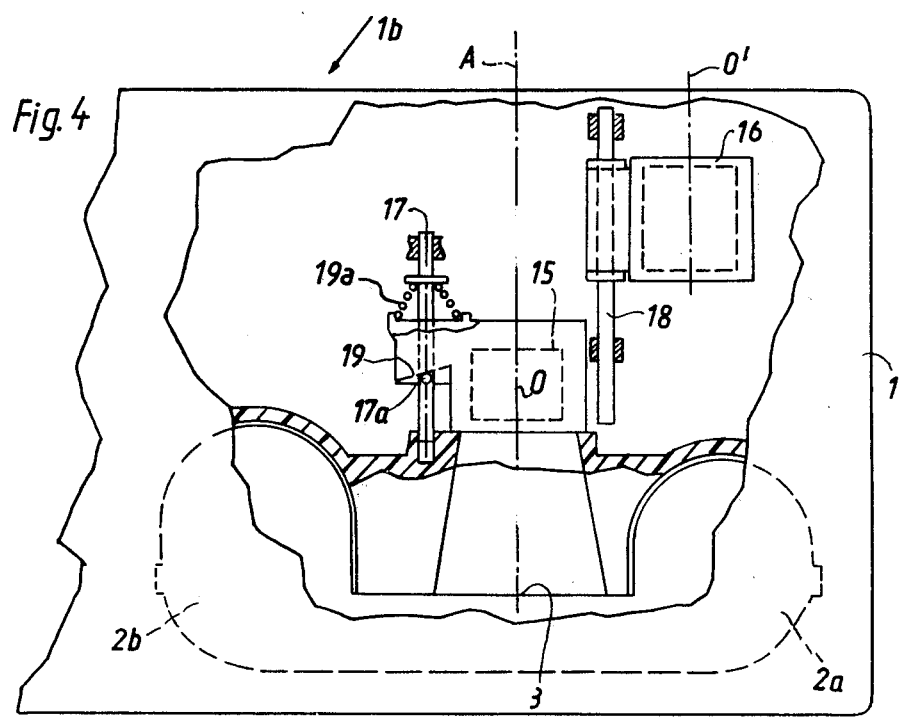

PHOTOGRAPHIC CAMERA

BACKGROUND OF THE INVENTION

The present invention relates to a photographic camera. More particularly, it relates to a multiple-lens camera wherein each lens can be selectively moved to and from a picture-taking position.

In motion-picture cameras it is known to provide two or more objectives, i.e., lenses, which are mounted on a slidable or rotary carriage and can be selectively moved into picture-taking position in which the respective lens is located on the optical axis of the camera. Such lenses may e.g., be a normal and a telephoto lens, or a normal and a wide-angle lens. An analogous arrangement has also been proposed for still cameras.

It is desirable to use such an arrangement also with the new small cameras which use film casettes, for example "type 110" cassettes. Here, however, a space problem is encountered. One of the purposes of developing these cassettes was to be able to construct small-dimensioned cameras, such as the so-called "pocket" cameras. The cassettes have an elongated web provided with the film-exposure window; at the opposite ends of the web are provided two chambers which project beyond the plane of the web (forwardly in the longitudinal direction of the optical axis when the cassette is located in the camera) and which respectively contain the supply and take-up roll for the film.

The lenses are mounted in the camera forwardly of the compartment for the cassette. If they are to be moved transversely of the optical axis into and out of picture-taking position, problems are encountered in view of the forwardly projecting film chambers of the cassette; because of the desire to keep the camera dimensions small, these problems cannot be solved by increasing the size of the camera housing to provide adequate space for the lens having the shortest focal length.

One theoretically possible solution would be to use a retro-focus arrangement of the type employed in conjunction with wide-angle lenses in single-lens reflex cameras. In practice, however, this solution is not feasible, because of the relatively great expense of such arrangements and also because in these arrangements the front lens must have an undesirably large diameter.

SUMMARY OF THE INVENTION

Accordingly, it is the general object of this invention to overcome the problems outlined above.

More particularly, it is an object of the present invention to provide a camera of the type under discussion wherein at least one of the multiple lenses can be accommodated in the space intermediate the film chambers of the cassette.

A particular object of the invention is to be able to accommodate in the aforementioned space the lens having the shortest focal length.

In persuance of the above objects, and others which will become apparent hereafter, a feature of the invention resides in a multiple-lens camera having an optical axis and which, briefly stated, comprises a housing; at least two different photographic lenses; means mounting the lenses for displacement in the housing in a direction transverse to the optical axis between respective lens-changing positions in each of which a different one of the lenses is located on the optical axis; and means for imparting to at least one of the lenses a component of movement in direction longitudinally of the optical axis in response to displacement of the lenses in the direction normal to the optical axis.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a view similar to FIG. 1, but of a second embodiment of the invention; and FIG. 4 also is a view similar to FIG. 1, but illustrating a third embodiment of the invention.

DESCRIPTION OF THE PREFERRED EMBODIMENTS

Figure 1:
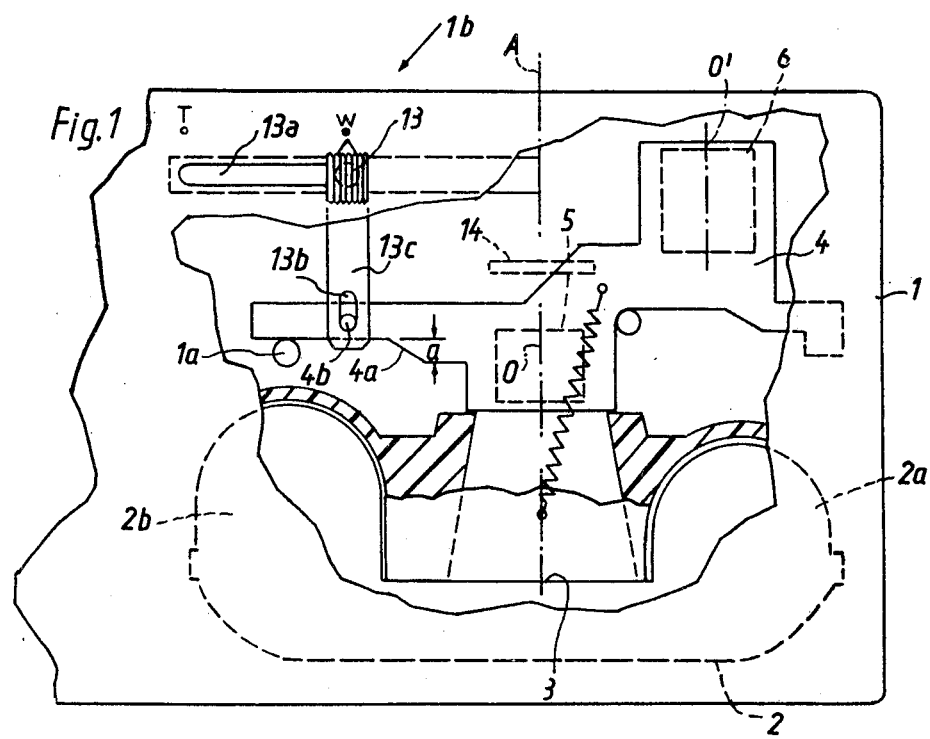
FIG. 1 is a diagrammatic view, partly broken away, showing a camera embodying the invention, a lens having the short focal length being located in operating position.
Figure 2:
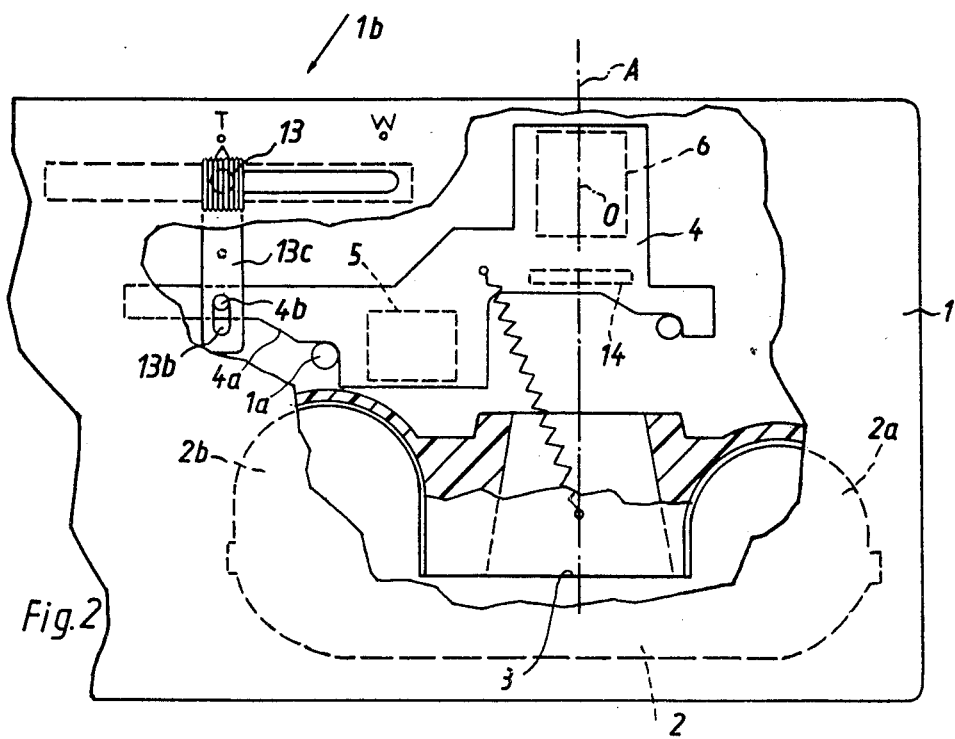
FIG. 2 is the same view as in FIG. 1, but showing a lens in operating position which has a long focal length.

The camera illstrated in FIGS. 1 and 2 has a housing 1 with a compartment for a film cassette 2 (e.g., a "type 110" cassette) having a central web provided with a film window 3 and at its opposite ends a film supply chamber 2a and a film take-up chamber 2b. The film transporting mechanism of the camera (not illustrated) incrementally advances the film from chamber 2a past window 3 into chamber 2b. That film increment which is located in registry with window 3 is exposed when a picture is taken with the camera.

Mounted in the housing 1, forwardly of the compartment accommodating the cassette 2, is a lens carrier 4 which supports the lenses, here two of them, namely a wide-angle lens 5 having an optical axis O and a telephoto lens 6 having an optical axis O'. Each one of these lenses 5, 6 can be moved to an operating position in which it is located in front of the window 3 on the optical axis A of the camera. FIG. 1 shows the wide-angle lens 5 to be in this position.

If it is desired to use the telephoto lens 6 instead of the lens 5, the carrier 4 is moved leftward in FIG. 1 by means of a handle 13 or similar engagement member which is slidable in a slot 13a of housing 1 between the positions W (Wide Angle) and T (Telephoto). This would not be possible if it were not for the features of the present invention since without these the rear portion of the mount for lens 5 would be intercepted by the take-up chamber 2b which projects into its path of movement.

To avoid such interference and permit unhindered movement of both lenses 5, 6 into and out of the operating position, the carrier 4 is provided with at least one inclined cam surface 4a and a stationary part of the camera, e.g., the housing 1, is provided with an abutment 1a. The cam surface 4a and the abutment 1a are so positioned relative to one another that during movement of the carrier 4 transverse to the optical axis of the camera they abut each other. Movement of the carrier 4 in the same direction as before, after such engagement has taken place, causes a component of movement in longitudinal direction of the optical axis of the camera to be imparted to the carrier 4. To permit this movement, the carrier 4 is provided with a projection 4b and the arm 13c of handle 13 has a slot 13b in which projection 4b can slide. This results in movement of the lens 5 by the distance a towards the front of camera (the top edge of FIG. 1) so that the rear portion of the mount for lens 5 now clears the film take-up chamber 2b.

The carrier 4 must, of course, be appropriately mounted so that it can perform the described movements in direction transverse to as well as longitudinal of the optical axis of the camera. However, this has not been illustrated because it is known per se in this art and forms no part of the invention. The camera has a shutter 14 which is shown only diagrammatically since it also forms no part of the invention. It is located in the region between the front lens component of lens 5 (each lens or objective is of course composed of a plurality of individual lenses, herein called lens components for differentiation) and the rear lens component of lens 6. Evidently, no part of the shutter 14 or of its operating mechanism may be so positioned that it can interfere with the free movement of the carrier 4.

A second embodiment of the invention is illustrated in FIG. 3. Elements corresponding to those shown in FIGS. 1 and 2 have been assigned the same reference numerals.

In place of the cooperating elements 1a, 4a the embodiment of FIG. 3 employs an elongated link member 11, opposite end portions of which are turnably connected to the housing 1 at pivot 12 and to the carrier 4 at pivot 12a, respectively. Leftward displacement of carrier 4 by movement of handle 13 from the position W (Wide Angle) to the position T (Telephoto) causes the link member 11 to turn about pivot 12. This results in movement of the end that is connected to carrier 4 at 12a, in the arcuate path 10 and thus enforces a displacement of carrier 4 lengthwise of the optical axis by the distance b so that the lens 5 clears the chamber 2b.

In both of the embodiments of FIGS. 1-2 and 3, the telephoto lens 6 moves through the same distance (a in FIGS. 1-2; b in FIG. 3) as the lens 5. This has the advantage that a lens 6 can be used which has a greater focal length than would be possible if lens 6 were moved only in direction normal to the axis A. Of course, when in operating position (see FIG. 2) the lens 6 will be located closely adjacent to the front wall 1b of the housing 1. This, however, is not a drawback since the front wall 1b must self-evidently be in any case provided with an opening (not shown) through which light enters the camera and with which the lenses 5, 6 register when they are located in operating position. If need be, the lens 6 could even be allowed to project outwardly through this opening; this is not objectionable since it will be retracted back into the housing 1 as soon as the lens 5 is brought to operating position.

The invention will thus be seen to offer the basic advantage of permitting the use of lenses 5, 6 having a greater focal-length differential than was previously possible while requiring no additional space in the camera housing 1.

A final exemplary embodiment is illustrated in FIG. 4.

In this Figure the lenses have reference numerals 15 and 16 and the carriage 4 is omitted. Instead, the lenses are mounted on pintles or pivot pins 17, 18 respectively, which are each mounted laterally offset from the optical axis of the camera and, in this particular embodiment, extend parallel to that optical axis. By pivoting the respective lenses, each lens 15, 16 can be individually moved to the operating position in front of window 3. Elements analogous to handle 13, e.g., levers, knobs or the like, may be provided to pivot the lenses but are not shown.

The wide-angle lens 15 has a journal provided with a helically curved cam face 19 at one end, and this cam face is maintained in abutment with a stationary projection 17a, due to the bias exerted by a spring 17a which reacts against the end of the journal remote from the projection 17a. Hence, turning of lens 15 about the pivot pin 17 causes it to be moved forwardly or rearwardly along the optical axis A depending upon whether it is turned into or out of the position shown in FIG. 4.

This embodiment might also be provided with a distance setting arrangement for each lens, although it would suffice to provide the arrangement only for the telephoto lens 16 since the wide-angle lens 15 can be used as a fixed-focus lens to median aperture setting.

The positioning of the shutter in FIGS. 3 and 4 is the same as in FIGS. 1-2, but the shutter is omitted for clarity.

It will be appreciated that the invention is susceptible of a range of modifications. For example, various function reversals could be employed, such as providing the cam surface 4a (FIGS. 1-2) on the casing 1 and the abutment 1a on the carriage, to mention an example, and all such modifications are desired to be encompassed by the scope of the appended claims.

It will be understood that each of the elements described above, or two or more together, may also find a useful application in other types of applications differing from the types described above.

While the invention has been illustrated and described as embodied in a cassette-type camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a multiple-lens photographic camera having an optical axis, a combination comprising a housing; at least two different photographic lenses; means including a carrier slidable transverse to said optical axis and mounting said lenses for displacement in said housing also transverse to said optical axis between respective lens-changing positions in each of which a different one of said lenses is located on said optical axis; and means for imparting to at least one of said lenses a component of movement in direction longitudinally of said optical axis in response to a displacement of said lenses in said direction transverse to said optical axis, including cooperating cam and follower portions on said housing and said carrier for effecting movement of said carrier in said longitudinal direction in response to sliding of said carrier in said transverse direction.

2. A combination as defined in claim 1, wherein said carrier mounts said lenses for displacement normal to said optical axis.

3. In a multiple-lens photographic camera having an optical axis, a combination comprising a housing; at least two different photographic lenses; means including a carrier slidable transverse to said optical axis and mounting said lenses for displacement in said housing also transverse to said optical axis between respective lens-changing positions in each of which a different one of said lenses is located on said optical axis; and means for imparting to at least one of said lenses a component of movement in direction longitudinally of said optical axis in response to displacement of said lenses in said direction transverse to said optical axis, including link means connecting said carrier with said housing and operative for compelling said carrier to perform said longitudinal movement in response to sliding of the carrier in said transverse direction.

4. A combination as defined in claim 3, wherein said link means comprises a link member having spaced end portions pivoted to said carrier and said housing, respectively.

5. In a multiple-lens photographic camera having an optical axis, a combination comprising a housing; at least two different photographic lenses; means mounting said lenses for displacement in said housing in a direction transverse to said optical axis between respective lens-changing positions in each of which a different one of said lenses is located on said optical axis, said mounting means comprising a pair of pintles each extending parallel to said optical axis and located eccentrically relative thereto, each of said lenses being mounted for pivoting on one of said pintles to and from the respective lens-changing position; and means for imparting to at least one of said lenses a component of movement in direction longitudinally of said optical axis in response to displacement of said lenses in said direction transverse to said optical axis.

6. A combination as defined in claim 5, wherein said imparting means comprises camming means for imparting to said at least one lens said longitudinal movement in response to pivoting of said at least one lens about the associated pintle.

7. A combination as defined in claim 6, said mounting means further comprising a journal for each of said lenses and journalling the same on an associated pintle; said camming means comprising a cam surface on the journal of said at least one lens and a cooperating abutment adjacent said cam surface.

8. A combination as defined in claim 7, said mounting means further comprising resiliently yieldable restoring means acting upon said journal of said at least one lens and yieldably resisting said longitudinal movement.

* * * * *